United States Patent [19]

Dudek

[11] Patent Number: 5,239,759
[45] Date of Patent: Aug. 31, 1993

[54] IMAGE SCANNER GUIDE

[76] Inventor: Raymond A. Dudek, 239 Plymouth St., Fitchburg, Mass. 01420

[21] Appl. No.: 617,963

[22] Filed: Nov. 26, 1990

Related U.S. Application Data

[63] Continuation of Ser. No. 345,193, Apr. 28, 1989, abandoned.

[51] Int. Cl.$^5$ .............................................. B43L 7/00
[52] U.S. Cl. ........................................ 33/42; 33/32.2; 235/472; 358/473
[58] Field of Search .................. 358/472, 473; 33/403, 33/430, 1 AA, 1 M, 42, 32.2, 573; 235/472, 482–486, 449; 434/116, 117; 250/566, 555, 271

[56] References Cited

U.S. PATENT DOCUMENTS

| | | | |
|---|---|---|---|
| 270,847 | 1/1883 | Rodman | 33/430 |
| 1,438,157 | 12/1922 | Bukachek et al. | 33/430 |
| 2,058,091 | 10/1936 | Marsella et al. | 33/479 X |
| 3,166,844 | 1/1965 | Pascoe et al. | 33/1 M |
| 3,238,501 | 3/1966 | Mak et al. | 235/472 X |
| 3,918,029 | 11/1975 | Lemelson | 235/472 |
| 3,918,179 | 11/1975 | Mauch et al. | 434/116 |
| 4,489,333 | 12/1984 | Anderka et al. | 33/18.1 |
| 4,561,183 | 12/1985 | Shores | 33/1 M |
| 4,684,998 | 8/1987 | Tanioka et al. | 358/473 |
| 4,707,747 | 11/1987 | Rockwell, III . | |
| 4,758,732 | 7/1988 | Kyriakides . | |
| 4,797,544 | 1/1989 | Montgomery | 250/221 |
| 4,831,459 | 5/1989 | Kimura | 358/473 |
| 4,860,377 | 8/1989 | Ishigaki | 250/566 X |

FOREIGN PATENT DOCUMENTS

| | | | |
|---|---|---|---|
| 2901651 | 7/1980 | Fed. Rep. of Germany | 33/1 M |
| 3006579 | 8/1981 | Fed. Rep. of Germany | 250/566 |
| 0233202 | 10/1944 | France | 33/32.2 |
| 2542483 | 9/1984 | France | 434/116 |

OTHER PUBLICATIONS

Xerox Disc. Journal "Hand Operated Scanner" J. C. Tandon vol. 9 #2 Mar./Apr. 1984.
User's Guide, LightningScan ™ Hand Scanner for Macintosh ®, Thunderware ®, 1989.
Heid, J., MacWorld, pp. 160–162, Oct., 1988.
Roth, S., MacWorld, p. 97, Mar., 1989.
Peterson, T., PC Magazine, pp. 234–236, Mar. 28, 1989.
Roth, S., MacWorld, pp. 124–133, May 1989.
Weiss, P., MacUser, p. 177, Jun. 1989.
Holtzman, J., PC Computing, p. 54, Jul. 1989.
Essex, D., PC Resource, pp. 60–68, Aug. 1989.
Johnson, L., MacUser, p. 30, Apr. 1989.

Primary Examiner—William A. Cuchlinski, Jr.
Attorney, Agent, or Firm—Hamilton, Brook, Smith & Reynolds

[57] ABSTRACT

A guide apparatus for a hand-held image scanner has a working surface with a longitudinal straight edge against which a brace for the scanner smoothly slides. A gap in the longitudinal member allows materials to be scanned to be slid through the longitudinal member onto or off of the working surface. A transverse alignment portion is perpendicular to the longitudinal member and allows a subject to be aligned on the working surface prior to scanning. Once the subject is aligned, the hand-scanner is placed in the scanner brace and a column of the subject is scanned by moving the scanner with the scanner brace along the straight edge of the longitudinal member.

13 Claims, 4 Drawing Sheets

IMAGE SCANNER GUIDE

This is a continuation of co-pending application Ser. No. 07/345,193 filed on Apr. 28, 1989, now abandoned.

BACKGROUND OF THE INVENTION

One of the most recent accessories for personal computers is the hand-held image scanner. Typically, the scanner is able to be coupled to a personal computer through an associated circuit board and software made compatible with the personal computer. After such coupling, the scanner enables the user to transfer desired information (e.g., text, photograph or other image, etc.) from a flat surface such as a sheet of paper (magazine, newspaper, etc.) through a window of the scanner to the terminal screen of the computer. This is accomplished by the user scanning, or technically speaking optically viewing, the sheet of information with the window of the hand-held image scanner, and the scanner hardware and software digitizing the information scanned and collected through the window. From the digitized information, the computer displays an image of the scanned information on the display terminal.

Generally, "scanning" is performed in a columnar fashion, that is from the top edge of the sheet down to the bottom edge along one longitudinal axis and repeated along parallel longitudinal axes, until all the desired information has been scanned through the window of the scanner. However, it is common for a user during scanning to unintentionally tilt the scanner so that one side of the scanner window reaches a line of information before the other side. Or the user tries to compensate for such tilting by repeatedly and alternately tilting the scanner from one side to the other side. This results in a wobbling motion during scanning. Such wobbling and, in fact, the slightest wobbling of the scanner during scanning generates noise and an inaccurate, if not unrecognizable, screen image of the desired scanned information.

Because a user's hand is usually not naturally steady enough to prevent such unwanted adverse movement during scanning, the difficulty in correctly operating the scanner is a major disadvantage. Although the scanner may have user adjustments for resolution (e.g., 100–400 dpi), gray scale and subject type (text versus graphics), these merely tailor scanning to the subject being scanned. Also an audio feature (a beep) sounds when the user is scanning at a rate above which the scanner is operable according to the resolution setting. None of these features, however, steady the hand of the user during scanning to prevent unwanted transverse movement.

Accordingly, means to aid the operation of such hand-held image scanners are needed.

SUMMARY OF THE INVENTION

The present invention discloses a guide apparatus for a hand-held image scanner comprising a longitudinal member having an edge along a major axis which serves as a geometrical straight edge. The guide apparatus further comprises a holding member adapted to carry or removably retain a hand-held image scanner in a position for scanning a subject. The holding member has a substantially straight and flat side which is positionable contiguous with the straight edge of the longitudinal member. The holding member cooperates with the straight edge such that the holding member with a scanner is moved over the subject along a longitudinal axis parallel with the major axis of the straight edge, thus scanning the subject in a smooth columnar fashion.

In a preferred embodiment a longitudinal member is mounted on a working surface which supports the subject. The longitudinal member is mounted on the working surface in a bridge-like manner such that a space between the working surface and the longitudinal member exists between end connection points of the longitudinal member to the working surface. This space is sized to allow a subject to fit through the space. The guide apparatus further comprises a transverse member having an edge along an axis perpendicular to the major axis of the straight edge. The transverse member is positioned such that the intersection between the transverse member and the longitudinal member form a right angle.

Preferably the holding member has two portions extending from a central area such that an obtuse angle is formed between the two extending portions. A hand held image scanner is partially retained within the obtuse angle formed by the two extending portions. Alternatively, the holding member may be shaped to surround the scanner on all but one side, thus providing more stability.

In an alternative embodiment, the guide apparatus comprises first and second longitudinal members having edges parallel to a major axis. The edge of the second longitudinal member faces the edge of the first longitudinal member and also serves as a geometrical straight edge. The holding member has a first and a second substantially flat side opposite one another. The second substantially flat side is positionable contiguous with the edge of the second longitudinal member while the first substantially flat side is positioned contiguous with the edge of the first longitudinal member. While maintaining this contact between the flat sides of the holding member and the edges of the first and second longitudinal members, the holding member with the scanner retained therein is moved along a longitudinal path defined between the first and second longitudinal members. As a result, the scanner smoothly scans a column of information. The two longitudinal members are moveably securable relative to one another and relative to the subject being scanned, thereby allowing different portions of the subject to be scanned without moving the subject.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
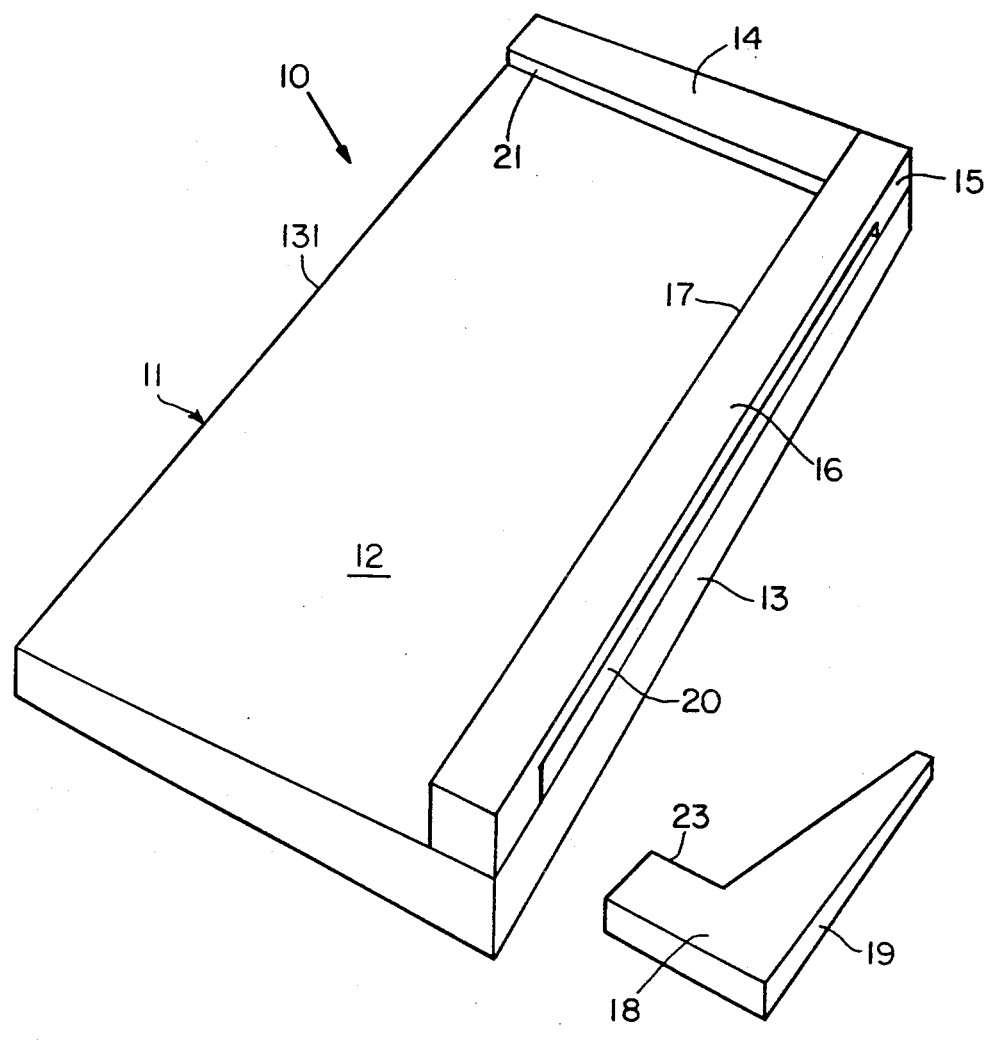
FIG. 1 is a perspective view of a scanner guide with working surface and scanner brace.

In FIG. 1 is shown a working surface 12 of an image scanner guide generally indicated at 10. The working surface 12 is an elevated platform having a hard, upper planar surface on which material to be scanned is removeably mounted. Fastened to working surface 12 is guide member 16 which projects from the working surface. The side walls 15,17 of the guide member 16 are parallel with the side walls 13, 131 of the working surface 12, and the inward facing side wall 17 of the guide member has a smooth, flat surface.

Positioned along and above the rear of working surface 12 and parallel with the front and rear of the working surface 12 is alignment portion 14. The inner facing front side 21 of alignment portion 14 has a smooth flat surface which is perpendicular to the inner side surface 17 of guide member 16. One side of alignment portion 14 makes contact with the inner side wall 17 of guide member 16 such that a right angle is formed at the intersection between the alignment portion front side 21 and the inner side 17 of guide member 16. A square or rectangular piece of material to be scanned is placed with one side against alignment portion 14 and an orthogonal side parallel to side 17 of guide member 16.

The guide member 16 of the present embodiment is somewhat bridge-shaped and has ends of the bridge shape connected to the working surface 12 at the front and the rear of the working surface. Gap 20 under the bridge shaped guide member 16 has a dimension along the length of the guide member which is long enough to accomodate the lengthwise dimension of most standard paper sizes. Thus, material to be scanned, such as a sheet of paper, can be positionally adjusted while laying on working surface 12 where portions of the material are slidable through gap 20. In this manner, the desired information to be scanned from the material is able to be positioned along and parallel with the inner side 17 of guide member 16 as discussed in more detail later.

Figure 2:
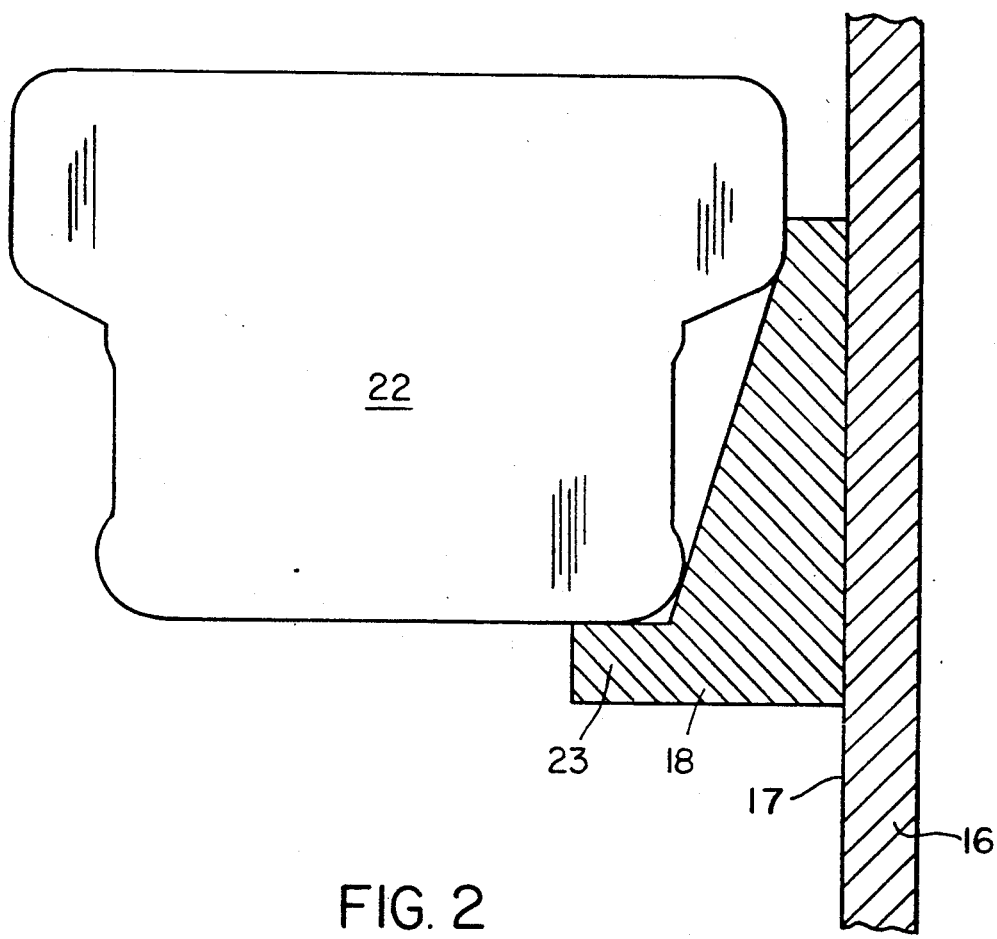
FIG. 2 is an enlarged view of a scanner positioned in a scanner brace against a portion of a guide member of the working surface.

Also shown in FIG. 1 is scanner brace 18 against which a hand-held image scanner is braced. The size and shape of scanner brace 18 is dependent on the type and brand of image scanner used. In the present embodiment, the scanner brace is designed to accomodate the Lightning Scan (TM) hand scanner, of Thunderware of Orinda, Calif. or any other scanner similar in shape thereto. As shown in FIGS. 1 and 2, the scanner brace 18 is somewhat L-shaped (oriented backwards). The horizontal portion or lip 23 of the L-shape accomodates the bottom right hand corner of hand scanner 22. The upper right hand portion of the scanner 22 is placed against the inward facing side at an upper end of the longitudinal leg of the L-shape of scanner brace 18. Using manual pressure during a typical scan, the scanner 22 is held in this position against brace 18. The outward facing side of the longitudinal leg of the L-shape of scanner brace 18 further has a smooth flat side surface 19 which is positioned against the left side surface 17 of guide member 16 during scanning. The two surfaces 19 and 17 are smooth relative to each other and slide easily against one another to aid scanning as discussed next.

During a typical scan, the material to be scanned, in this case a printed page, is placed on the working surface 12 with a top edge of the page residing against the front side 21 of alignment portion 14 and the information to be scanned first from the page is positioned along left side 17 of guide member 16. An orthogonal side edge of the page thus lies along an axis parallel with guide member 16. This placement of the page on working surface 12 ensures that during scanning the motion of the scanner 22 is in straight columns relative to the orientation of the subject page. Once the subject page is aligned on working surface 12, the scanner brace 18 is placed with its flat side surface 19 flat against the left side 17 of guide member 16, and the scanner is positioned in the scanner brace as shown in FIG. 2. Starting with brace 18 and scanner 22 at the intersection of alignment portion 14 and guide member 16, the scanner brace 18 and scanner 22 (turned on) are slid across the surface of the page with manual pressure keeping the flat side surface 19 of scanner brace 18 flush against the left side 17 of guide member 16. Thus, the scanner 22 scans information along a straight column across the subject page without transverse motion (i.e., wobbling) of the scanner.

Since pages to be scanned are often wider than the scanning width of the scanner 22, it may be necessary to scan the page in several columns. The gap 20 of guide member 16 allows a subject page to be only partially on the working surface 12 with the remainder of the page lying over the side 13 of the working surface 12 through gap 20. Thus, a left hand column of the page can be scanned using the scanning guide 10 while keeping that portion of the page laying flat on working surface 12. Once a column is scanned, the page is moved to the left a distance approximately equal to the width of the scanned column. With the top edge of the page still positioned along alignment portion 14, the next column of the page is scanned. These steps are repeated until the entire page has been scanned. New pages to be scanned may similarly be slid onto the scanning guide through guide member gap 20.

Figure 3:
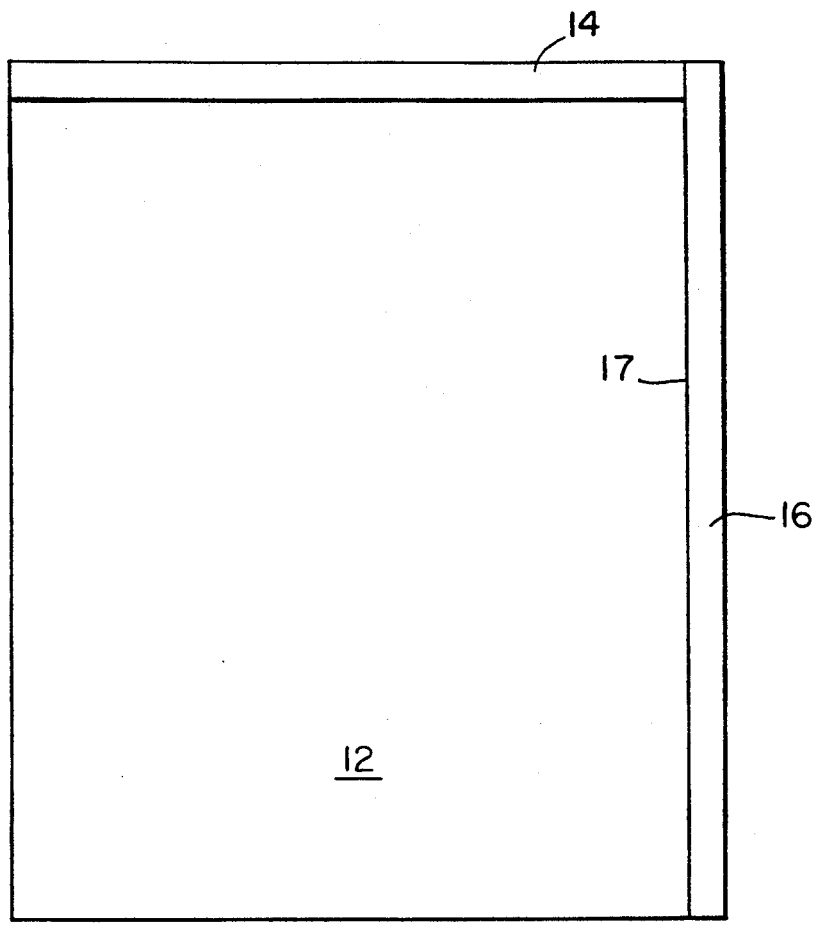
FIG. 3 is a schematic view of a scanner guide with working surface, scanner, and an alternative embodiment of a scanner brace.
Figure 3:
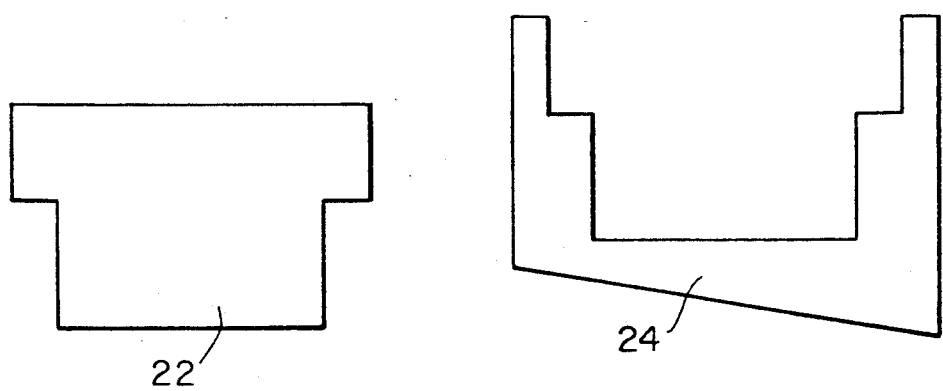

An alternative embodiment of the scanner brace is possible which provides more stability than the scanner brace 18 of FIGS. 1 and 2. Scanner brace 24 is shown in FIG. 3 pictured next to image scanner 22. It is used in the same manner as scanner brace 18 with the right side (flat surface side 19) in contact with the left side 17 of the guide member 16. Scanner brace 24 is shaped such that it surrounds the scanner 22 on all but one side to provide more stable control of the scanner 22. Thus the scanner brace 24 provides ease of control and less chance of the scanner 22 slipping away from the scanner brace. However scanner brace 24 is bulkier than scanner brace 18 and must be custom fit to the particular scanner, whereas scanner brace 18 may accomodate a number of different but similarly shaped scanners.

Figure 4A:
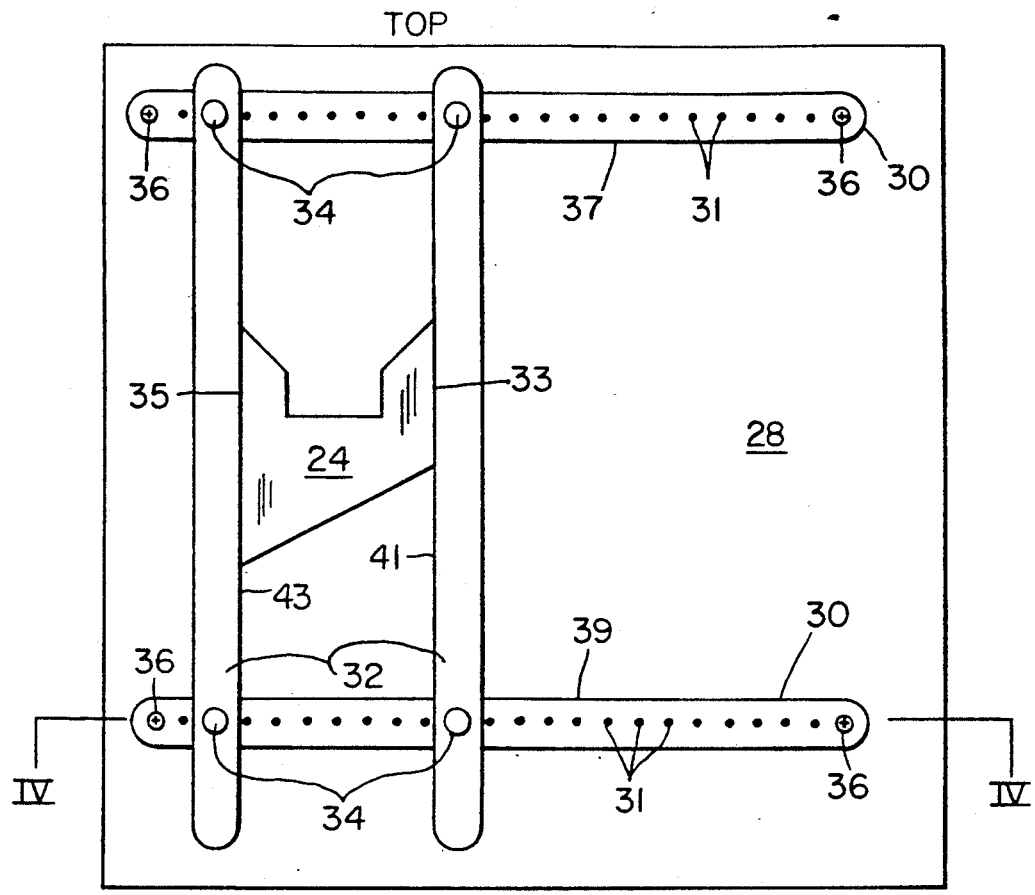
FIG. 4A is a schematic view of an alternative embodiment of a scanner guide.
Figure 4B:
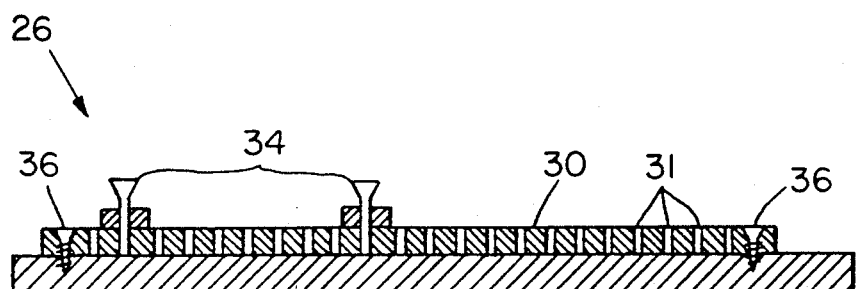
FIG. 4B is a cross sectional view through line IV—IV of FIG. 4A.

For high precision scanning it may be desirable to have even more stability control than that provided with image scanner guide 10. A top view and a cross sectional view of a precision scanner guide 26 is shown in FIGS. 4A and 4B. The upper planar or top surface 28 of precision scanner guide 26 is generally rectangular in shape. Two pin brackets 30 are fastened to the top surface 28 by mounting screws 36. The pin brackets 30 are parallel to one another and are separated by a distance which is at least large enough to accomodate the lengthwise dimension of most standard paper sizes. Along the length of each pin bracket 30 is a series of equally spaced pin holes 31. The spacing between the pin holes is the same on each pin bracket 30 and the holes on the two pin brackets are lined up with one another. This alignment is such that each pin hole on one pin bracket 30 has a corresponding pin hole on the other pin bracket 30 which is directly across from it along an axis or line perpendicular to the pin brackets 30.

Two guide rails 32 each have smooth longitudinal sides 41,43 and a pin hole near each end through which a pin 34 is placed. The pins 34 are longer than the depth of the guide rails 32 and extend through to the pin holes of pin brackets 30 as shown in FIG. 4B. For each guide rail 32, the spacing between the two end of holes of the guide rail is such that the guide rail may be fastened to the two pin brackets 30 by pins 34. However, the distance between the two holes on one guide rail 32 is equal to the distance between any hole in one pin bracket and its corresponding hole in the opposite pin bracket 30. This allows the guide rails 32 to be attached only between two pin holes directly across from one another from one pin bracket to the other along an axis perpendicular to the pin brackets 30. Because the pin holes 31 are equally spaced in each pin bracket 30 and are directly across from one another from one pin bracket 30 to the other, the guide rails 32 when attached by pins 34 are parallel to one another and perpendicular to the pin brackets 30.

The spacing of the pin holes 31 on the pin brackets 30 is also set to accomodate the width of the scanner brace 24 between guide rails 32 pinned into pinholes 31. The distance between facing sides of guide rails 32 pinned a certain number of pin holes apart is made equal to the width of the scanner brace 24. The scanner brace 24 is the same as the scanner brace of FIG. 3, but for the precision scanner guide it is necessary that both sides 33 and 35 of the scanner brace 24 have smooth flat surfaces rather than just one. This is because the scanner brace 24 makes contact with the sides of both guide rails 32, and must slide smoothly along them.

In a typical scan using the precision scanner guide 26, the material to be scanned is aligned on the upper planar surface 28 of the scanner guide 26 using the straight edges 37 and 39 (FIG. 4A) of the pin brackets 30, which are perpendicular to the side edges 41 and 43 of the guide rails 32. If desired, the material to be scanned may be removeably affixed to the surface 28 once it is aligned to ensure that it does not move during scanning. The guide rails 32 are then pinned to the pin brackets 30 such that they are spaced apart by a distance equal to the width of the scanner brace 24, and positioned such that the space between them is over the portion of the material which is to be scanned. The scanner brace 24 is then placed between the two guide rails 32 with the image scanner 24 properly in place in the scanner brace (not shown in FIG. 4A). A column of information is then scanned by moving the scanner brace 24 and scanner 22 slowly along the side edges 41 and 43 of the two guide rails 32 with both sides 33,35 of scanner brace 24 flush against the respective guide rail side edges 41 and 43. Thus scanning is accomplished across the portion of the page between the two guide rails 32.

The next column of information is then scanned by moving the material to be scanned relative to the position of the guide rails. However, if the material is affixed to the surface 28 of the precision scanner guide 26 it may be desirable not to move the material and risk misalignment during repositioning. In such a case, the guide rails 32 are moved and reconnected to the pin brackets 30 in a different location. The new position of the guide rails 32 is set such that the space between them is directly over the next column of information to be scanned. The scanner brace 24 and scanner 22 are once again placed between the guide rails 32 and the next column is scanned. The steps of this procedure are thus continued until the entire surface or the desired portions of the material are scanned.

It is understood that information of interest that is to be scanned may not be printed squarely on a page or the page itself may not be square. Thus alignment of the page with the orthogonal edges provided by the above described scanner guides 10 or 26 is not helpful to scanning. In such instances, the subject page is positioned on the working surface in a manner which orients the "to be scanned" information parallel with and along the straight edge of the guide member 16 or guide rail 32. To accommodate such orientation of the subject page, alignment portion 14 may be spaced above the working surface 12 between opposite ends of the portion 14 which connect to the working surface 12. The computer screen image which results from scanning along this straight edge can be visually inspected for squareness with respect to the screen boundaries. From such inspection the user determines if the subject page needs to be positionally readjusted on the working surface such that the resulting screen image is displayed and subsequently printed on a sheet of paper squarely. Accordingly, the lack of squareness of the information with respect to the subject page on which the information is printed is corrected during or as a part of scanning with the scanner guide of the present invention.

Other techniques for correcting squareness of information with respect to the computer screen (or printer paper) boundaries during scanning with the scanner guide of the present invention include moving the subject page in a back and forth (left to right to left, etc.) tilting manner while scanning a sample portion of the subject page. This movement of the page generates an image on the computer screen which eventually looks representative of the desired information. At the point where the computer screen image looks correctly representative, the user stops moving the subject page and holds the subject page in that position. It is this position of the page which corrects the off-square printing of the information on the subject page. Scanning is thus accomplished with this orientation of the subject page on the working surface and the scanner guide straight edge positioned along an axis parallel with the longitudinal axis of the information on the subject page so oriented.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. Guide apparatus for guiding a hand held image scanner along a subject to be scanned, the hand held image scanner being of the type having means to enable transfer of desired information in two dimensions from a printed subject to a computer for display of an image of the subject through a computer display terminal, the guide apparatus comprising:
   a working surface for supporting the subject during scanning;
   a longitudinal member adapted to be mounted to the working surface during scanning and having an edge along a major axis, the edge serving as a geometrical straight edge, at least one of the subject and longitudinal member being. positionable relative to the other on the working surface such that the longitudinal member bridges over the subject with the straight edge aligned for scanning along over the subject; and a holding member adapted to removably retain he image scanner, in retrofit, in a position for scanning the subject, the holding member including a) a longitudinal leg having a substantially flat outer side which is positionable contiguous with the straight edge of the longitudinal member, and an inner side opposite the flat outer side, and b) a transverse leg for holding the image scanner at a constant angle with respect to the major axis of the longitudinal member, the transverse leg extending from the longitudinal leg such that a surface of the transverse leg lies adjacent the inner side of the longitudinal leg, the surface of the transverse leg and the inner side of the longitudinal leg defining a retaining space therebetween, wherein the longitudinal leg and transverse leg of the holding member form an obtuse angle with each other, the retaining space being defined within the obtuse angle such that a portion of the image scanner is surrounded by the longitudinal and transverse legs and the holding member retains the scanner, and wherein the image scanner located in the retaining space and manually held against the holding member by a user is given support by the longitudinal leg and the transverse leg to restrain the scanner from rotational motion in the plane of the subject such that, during scanner operation the holding member retains the image scanner (i) at a constant angle with respect to the major axis of the longitudinal member and (ii) along one axis, at a time, parallel to the major axis of the longitudinal member where the flat outer side of the longitudinal leg is slideably positioned along the straight edge, manual movement of the holding member, with the image scanner retained therein, along a length of the longitudinal member with manually supplied transverse pressure sufficient to hold the flat outer side of the holding member against the straight edge along the length of the longitudinal member, throughout each pass of the scanner over the subject, providing scanner operation both in a wobble-free fashion with respect to axes transverse to the major axis in the plane of the subject and in a columnar fashion along a longitudinal axis parallel with the major axis over the subject to scan the subject.

2. Guide apparatus as claimed in claim 1 wherein said longitudinal member is adapted to be mounted on said working surface in a manner providing a space between the working surface and the longitudinal member and between points of connection of opposite ends of the longitudinal member to the working surface.

3. Guide apparatus as claimed in claim 2 wherein said space between the working surface and the longitudinal member has dimensions which allow the subject to fit through the space.

4. Guide apparatus as claimed in claim 1 further comprising a transverse member having an edge along an axis perpendicular to the major axis, such that the transverse member and longitudinal member define a right angle for enabling orientation of the subject on the working surface.

5. Guide apparatus as claimed in claim 4 wherein said transverse member is mounted on the working surface which supports the subject.

6. Guide apparatus as claimed in claim 1 wherein the holding member is shaped to surround the scanner substantially on all but one side to retain the scanner.

7. Guide apparatus for guiding a hand held image scanner along a subject to be scanned, the hand held image scanner being of the type having means to enable transfer of desired information in two dimensions from a printed subject to a computer for display of an image of the subject through a computer display terminal, the guide apparatus comprising:

a working surface for supporting the subject during scanning;

a longitudinal member adapted to be mounted to the working surface during scanning and having an edge along a major axis, the edge serving as a geometrical straight edge, at least one of the subject and longitudinal member being positionable relative to the other on the working surface such that the longitudinal member bridges over the subject with the straight edge aligned for scanning along over the subject, a holding member adapted to removably retain he image scanner, in retrofit, in a position for scanning the subject, the holding member including a) a longitudinal leg having a substantially flat outer side which is positionable contiguous with the straight edge of the longitudinal member, and an inner side opposite the flat outer side, and b) a transverse leg for holding the image scanner at a constant angle with respect to the major axis of the longitudinal member, the transverse leg extending from the longitudinal leg such that a surface of the transverse leg lies adjacent the inner side of the longitudinal leg, the surface of the transverse leg and the inner side of the longitudinal leg defining a retaining space therebetween, wherein the image scanner located in the retaining space and manually held against the holding member by a user is given support by the longitudinal leg and the transverse leg to restrain the scanner from rotational motion in the plane of the subject such that, during scanner operation the holding member retains the image scanner (i) at a constant angle with respect to the major axis of the longitudinal member and (ii) along one axis, at a time, parallel to the major axis of the longitudinal member where the flat outer side of the longitudinal leg is slideably positioned along the straight edge, manual movement of the holding member, with the image scanner retained therein, along a length of the longitudinal member with manually supplied transverse pressure sufficient to hold the flat outer side of the holding member against the straight edge along the length of the longitudinal member, throughout each pass of the scanner over the subject, providing scanner operation both in a wobble-free fashion with respect to axes transverse to the major axis in the plane of the subject and in a columnar fashion along a longitudinal axis parallel with the major axis over the subject to scan the subject, and wherein the longitudinal member is a first longitudinal member and the guide apparatus further comprises a second longitudinal member having an edge along a longitudinal axis parallel with the major axis of the edge of the first longitudinal member, the edge of the second longitudinal member facing the edge of the first longitudinal member and serving as a geometrical straight edge, the first longitudinal member and the second longitudinal member being movably securable relative to one another and relative to the subject being scanned.

8. Guide apparatus as claimed in claim 7 wherein the longitudinal leg of the holding member is a first longitudinal leg and the holding member further comprises a second longitudinal leg extending from the transverse leg opposite the first longitudinal leg and having a substantially flat outer side which is positionable contiguous with the edge of the second longitudinal member while the first longitudinal leg flat outer side is positioned contiguous with the edge of the first longitudinal member to cooperate therewith during scanning.

9. A method of optically scanning a desired image from a subject supported by a working surface, comprising the steps of:

providing a first straight edge along a major axis, the first straight edge adapted to be mounted to the working surface during scanning, at least one of the subject and first straight edge being positionable relative to the other such that the straight edge lies aligned with the image for scanning along over the image;

holding in a holding member a hand-held scanner of the type having means to enable transfer of desired information in two dimensions from a printed subject to a computer for computer display of an image of the subject, the holding member being adapted to removably retain the hand-held image scanner, in retrofit, in a position for scanning the desired image, the holding member including a longitudinal leg having a substantially flat outer side and an inner side opposite the flat outer side, and b) a transverse leg for steadying the scanner at a constant angle with respect to the major axis in the plane of the subject, the transverse leg extending from the longitudinal leg such that a surface of the transverse leg lies adjacent the inner side of the longitudinal leg, the surface of the transverse leg and the inner side of the longitudinal leg defining a retaining space therebetween, wherein the hand-held image scanner located in the retaining space and manually held against the holding member is restrained from rotational motion in the plane of the subject, by the longitudinal leg and transverse leg; and moving the holding member with the image scanner retained therein over the desired image to scan the image, said moving including maintaining with manually supplied transverse pressure the flat outer side of the holding member positioned contiguous with the first straight edge along the length of the first straight edge throughout such movement, the holding member retaining the scanner (i) at a constant angle with respect to the major axis in the plane of the subject and (ii) along one axis at a time parallel to the major axis, such that for each pass of the scanner over the desired image the scanner scans in both a) a wobble-free fashion with respect to axes transverse to the major axis in the plane of the subject, and b) a columnar fashion along a longitudinal axis parallel with the major axis of the first straight edge.

10. A method as claimed in claim 9 further comprising the step of providing a second straight edge perpendicular to the major axis and positioned such that the two straight edges form a right angle for enabling orientation of the desired image on the working surface.

11. A method as claimed in claim 10 wherein the step of providing a first straight edge includes providing a longitudinal member mounted on the working surface perpendicular to the second straight edge, the longitudinal member having an edge which serves as the first straight edge and the longitudinal member being mounted to the working surface in a bridge-like fashion such that a gap exists between the working surface and the edge of the longitudinal member.

12. A method as claimed in claim 11 further comprising the step of sliding a portion of the subject carrying the image to be scanned through the gap to orient the image on the working surface, with respect to the longitudinal member and second straight edge, prior to moving the holding member and scanner over the desired image.

13. A method as claimed in claim 9 further comprising providing a second straight edge parallel to the major axis, the two straight edges facing one another, and wherein the longitudinal leg of the holding member is a first longitudinal leg and the holding member further includes a second longitudinal leg opposite the first longitudinal leg across the transverse leg, the second longitudinal leg having a substantially flat outer side which is positioned contiguous with the second straight edge during movement of the holding member and scanner to scan the desired image.

* * * * *